United States Patent
LaRaus

[15] 3,692,180
[45] Sept. 19, 1972

[54] COUNTERTOP WATER PURIFIER

[72] Inventor: Julius LaRaus, 150 Crandon Way, Rochester, N.Y.

[73] Assignee: Sadye R. LaRaus, Rochester, N.Y.

[22] Filed: April 5, 1971

[21] Appl. No.: 131,262

[52] U.S. Cl. .................... 210/139, 210/188, 210/192
[51] Int. Cl. ............................................. B01d 35/02
[58] Field of Search ....................... 210/139, 188, 192

[56] References Cited

UNITED STATES PATENTS 1,420,838  6/1922  Held ......................... 210/192
3,448,045  6/1969  Hess et al ................ 210/192 X

*Primary Examiner*—Frank A. Spear, Jr.
*Attorney*—Shlesinger, Fitzsimmons & Shlesinger

[57] ABSTRACT

A small ozone generator (e.g., approximately 1 gr/hr.) is mounted in a portable base or stand together with a small air pump and transformer, which are controlled by a manually operable timer. A plastic water jug, which is removably mounted on the base, has a recessed lower end connected to a normally closed spiggot, and containing an activated-charcoal filter. A vented cap containing another activated charcoal filter is removably mounted over the opening in the top of the container. When the timer is turned on, ozone gas from the generator is fed for a predetermined time to a diffuser in the bottom of the container which breaks the ozone into small bubbles that rise through the water in the container. The charcoal filters remove any excess ozone from the gases and water discharged from the unit.

11 Claims, 4 Drawing Figures

PATENTED SEP 19 1972   3,692,180

INVENTOR.
JULIUS LA RAUS
BY
Shlesinger, Fitzsimmons & Shlesinger
ATTORNEYS

COUNTERTOP WATER PURIFIER

This invention relates to batch-type water purifiers, more particularly to a portable or countertop variety having a small water container through which ozone is adapted to be bubbled for a preselected period of time.

It is well known that ozone has properties that are particularly valuable for purifying water. Moreover, ozone generators have been connected heretofore in various ways directly to drinking water supplies in order to assist in the purification of drinking water before it reaches a water tap, or other outlet. While the use of ozone in this manner is suitable for servicing, for example, the needs of a homeowner or consumer that daily uses relatively large quantities of drinking water, such known devices are not suitable for campers, for example, or for other consumers who are not serviced by a reliable municipal or other central water supply system.

It is an object of this invention, therefore, to provide a relatively small, compact, portable, batch-type water purifier, which is designed to remove foreign particles, odors and tastes from drinking water, and the like.

Another object of this invention is to provide a novel purifier of the type described, which has a small container for drinking water, and presettable means for bubbling ozone through the water in the container for a predetermined period of time.

Still another object of this invention is to provide a novel purifier of the type described, which has means for preventing excess ozone from being exhausted to the atmosphere surrounding the purifier.

A further object of this invention is to provide a small, batch-type water purifier having an electrically operated ozone generator for supplying ozone to the water that is to be purified, and means for automatically shutting off the generator a predetermined period of time after it has been energized, thereby to prevent accidental development of excess ozone gas.

Other objects of the invention will be apparent hereinafter from the specification and from the recital of the appended claims, particularly when read in conjunction with the accompanying drawing.

Figure 1:
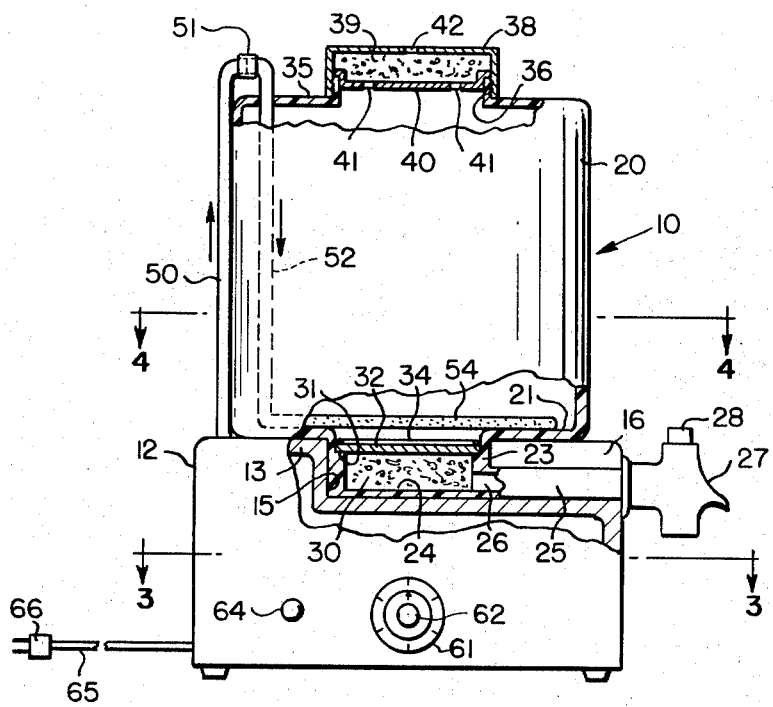
FIG. 1 is a side elevational view of a batch-type water purifier made in accordance with one embodiment of this invention, portions of the water container and base of the purifier being cut away and shown in section for purposes of illustration.
Figure 4:
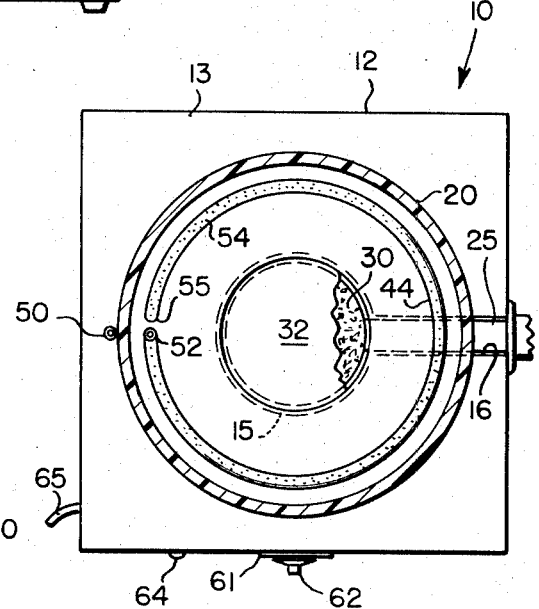
FIG. 4 is a fragmentary sectional view taken along the line 4—4 in FIG. 1 looking in the direction of the arrows.

Referring now to the drawing by numerals of reference, 10 denotes generally a portable water purifying unit comprising a hollow, generally rectangular base or stand 12, which is closed at its upper end by a integral, horizontally disposed wall 13. In its center wall 13 has a cylindrical pocket or recess 15, which communicates with the inner end of a rectilinear groove 16, which is formed in the upper surface of wall 13 radially of its recess 15. The opposite or outer end of the groove 16 opens on the front (the right side in FIGS. 1 and 4) of base 12.

Removably mounted on base 12 is a cylindrical container 20, which is made from a transparent plastic material, or the like, and which may have a capacity of, for example, approximately 2 gallons. This container is closed at its lower end of by integral, transverse wall 21, which is removably seated around its marginal edge on the upper wall 13 of base 12. In its center wall 21 has a reduced-diameter annular wall portion 23, which projects slidably and coaxially downwardly into the recess 15 in the base 12, and which is closed at its lower end by an integral bottom wall 24 that seats against the flat bottom of the recess 15.

Integral at its inner end with the container's annular wall portion 23, and projecting radially outwardly through the groove 16 in the base 12, is a plastic outlet duct or pipe 25. The axial bore 26 in pipe 25 communicates at its inner end through the annular wall 23 with the interior of container 20. Fastened to the outer end of pipe 25 at the front of the unit 10 is a conventional spiggot 27 containing a manually operable valve 28 for controlling the discharge of water out of the lower, outlet end of the spiggot. Valve 27 is, of course, normally closed, but may be depressed in known manner to allow liquid in the container to be discharged by gravity through the outlet of the spiggot 27.

Removably mounted in the cylindrical well formed in the bottom of container 20 by its annular extension 23, is a disc-shaped, replaceable filter cartridge 30, which contains activated charcoal. Filter 30 has an axial length greater than the diameter of the bore 26 in pipe 25, and a diameter approximately equal to the inner diameter of wall 23, so that the outer peripheral surface of the filter entirely covers the inner end of the bore 26.

Removably seated on top of filter 30 with its marginal edge overlying an internal, circumferential shoulder 31, which is formed on the inside of wall 23 adjacent its upper end, is a further, disc-shaped filter 32. This filter, which is also replaceable, is made from a porous paper material, or the like, and is substantially thinner than the activated charcoal filter 30. A resilient C-ring 34, or the like, is press-fit into the top of he bore in wall 23 to hold the filters 30 and 32 in place.

In its upper end 35 container 20 has therethrough a relatively large, central opening surrounded by an externally threaded annular flange 36. A cylindrically shaped cap 38 is removably threaded at its lower, open end onto the flange 36 to cover the opening in the top of the container 20. Removably secured, for example by a press fit, in the lower end of cap 38 in spaced, confronting relation to the closed end of the cap is a disc-shaped retainer plate 40. The marginal edge of this plate overlies the upper end of the flange 36 on the container 20. Removably mounted in the space between the confronting surfaces of the plate 40 and the closed end of cap 38 is a disposable filter cartridge 39, which also contains activated charcoal. Plate 40 has therethrough a plurality of circular holes or ports 41, which are equi-spaced radially from the center of the plate; and cap 38 has in the center of its closed end a single port or vent 42, the purpose of which is described hereinafter.

Mounted in the base 12 is a conventional air pump 44, the output of which is connected by a pipe or tube 45 to the input of a conventional ozone generator 46, which is also mounted in base 12 adjacent pump 44. A high voltage (for example 4,000 to 5,000 volts) transformer 48 is also mounted in the base 12 adjacent the generator 46, and is operatively connected thereto in a known manner for supplying power to the generator.

The ozone gas developed by the generator 46 is conveyed therefrom by a plastic tube 50, or the like, upwardly through the top 13 of the base 12, and vertically upwardly along the outside of the container 20 to a point spaced slightly above its upper end 35. Here the upper end of tube 50 is releasably connected by a resilient sleeve or slip coupling 51 to the upper end of a further plastic pipe or tube 52, which projects vertically downwardly into the container 20 through an opening in its top 35. The lower end of pipe 52 is connected in the container 20 to one end of a tubular ozone diffuser 54, which is seated in the form of an arcuate coil or loop on the bottom of the container 20. The opposite or free end 55 of the tubular diffuser is closed or deadended; and intermediate its ends the diffuser has in its tubular wall a plurality of tiny holes or perforations through which ozone gas may pass into container 20.

Mounted in one side of the base 12 is a conventional timer switch unit 60 having a stationary dial plate 61, which is secured to the outside of the base 12, and a rotatable operating knob 62, which is disposed at the exterior of the base to overly the dial plate 61. Mounted in the same side of the base 12 to be viewable from the exterior thereof is a small lamp 64 for indicating when the generator 46 is operating.

Electrical power for energizing the lamp 64, the motor (not illustrated) for the pump 44, and the transformer 48, is supplied by a conventional wire lead 65, which has the usual plug 66 for attaching the lead to a conventional A.C. wall outlet or receptacle. The timer 60 operates a switch (not illustrated), which controls the application of electrical power from line 65 to the elements 44, 48 and 64. The knob 62 on the timer is spring-loaded in the usual manner to a zero or start position in which, for example, an arrow or other indicator on the knob registers with a zero or like indicium on the dial plate 61. In this position of the knob 62, the switch controlled by the timer 60 is held in its open position, so that the motor for pump 44, the transformer 48, and the lamp 64 are all deenergized.

In use, the container 20 is first filled with the drinking water that is to be purified. This may be accomplished by manually slipping the coupling 51 axially in one direction or the other to disengage the confronting ends of the pipes 50 and 52. This disconnects the container 20 from the base 12 so that the container can be lifted off the base and carried to the faucet or other source of the water that is to be purified. After the cover or cap 38 has been removed, the container 20 is filled with water, and the cap 38 is then replaced, and the container 20 is once again placed on top of the base 12 in the manner illustrated in FIG. 1.

After the slip coupling 51 has been shifted back into its operative position (FIG. 1), wherein it again connects together the upper ends of the pipes 50 and 52, the operator rotates the timer knob 62 in a direction to actuate the timer 60. By way of example, the timer 60 may be of the five minute variety, whereby upon manual rotation of its knob 62 one revolution in, for example, a clockwise direction, it will take 5 minutes for the knob to return to its zero or starting position. During this 5 minute interval the switch, which controls the operation of the unit, will be maintained in its closed position. As soon as the 5 minute interval expires, and the knob 62 has returned to its zero position, the switch will automatically open to deenergize the unit. Obviously the timer 60 may be selected to provide any desired maximum time interval, and may be set to operate the generator 46 for the full interval or any portion thereof.

During the time that the unit is energized, power is supplied by the line 65 to the motor for the pump 44, to the transformer 48, and to the indicator lamp 64. The air pumped by line 45 to the generator 46 is broken down by the high voltage supplied by the transformer 48, thus creating, in known manner, a supply of ozone gas which is fed through the pipes 50 and 52 to the diffuser 54. The perforations in this diffuser are tiny, so that the ozone gas is broken up into a plurality of very small bubbles that rise through the water in container 20. The well-dispersed ozone gas thus removes undesirable odors and tastes normally present in the water because of excess chlorine, sulphur, and the like.

The gases that are developed in the container 20 during the operation of the unit pass through the ports 41 in the plate 40, and then through the activated charcoal filter 39 and the single vent 42 in the top of cap 38 into the atmosphere at the exterior of the container. The activated charcoal in filter 39 operates to remove any excess ozone, which has not been utilized in oxidizing impurities in the water. In order to prevent damage to, for example, rubber fittings and similar items that are frequently employed in a kitchen or other area where the unit 10 is likely to be employed, it is essential that any such excess ozone be removed from the gases before they are discharged from the vent 42.

When the timer 60 times out and opens the associated control switch, the lamp 64 becomes deenergized, thus indicating that the generator 46 is no longer operating, and that the water in the container 20 has been purified and is ready to be used.

In practice it has been found that a conventional ozone generator of the type capable of developing approximately 1 gram of ozone per hour is suitable for purifying the contents of the container 20 (approximately 2 gallons) within the 5 minute period afforded by the timer 60. Where a timer with a maximum duration greater than 5 minutes is employed, the operating time of generator 46 may be extended beyond 5 minutes for more polluted or foul water. When water is drawn off from the bottom of the container 20 by the valve 28, any particles or solids precipitated out of the water by the ozoning process will be filtered out of the water by the paper filter 32, before the water reaches the charcoal filter 30. Filter 30 then operates further to remove any excess ozone or other foreign tastes or odors in the water before the water passes out of the spiggot 27.

Whenever the filter 32 becomes dirty, it may be removed and replaced by a new paper filter. For this reason the opening in the upper end of container 20 is made large enough so that one's hand can be inserted into the container to remove the filter 32, and/or to clean the interior of the container. Similarly, the activated charcoal filter 30 and 39 can be, and should be, replaced periodically. Particularly in the case of the upper filter 39, replacement should be made often enough to assure that the filter is capable of absorbing any excess ozone discharged from the water in the container. It has been found that replacement after thirty or so operations of the unit 10 should be satisfactory.

Figure 2:
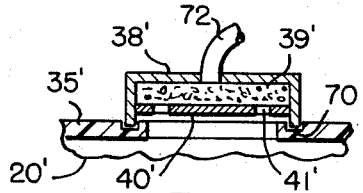
FIG. 2 is a fragmentary sectional view illustrating a modified form of cover, which is adapted to be used on the water container illustrated in FIG. 1.
Figure 3:
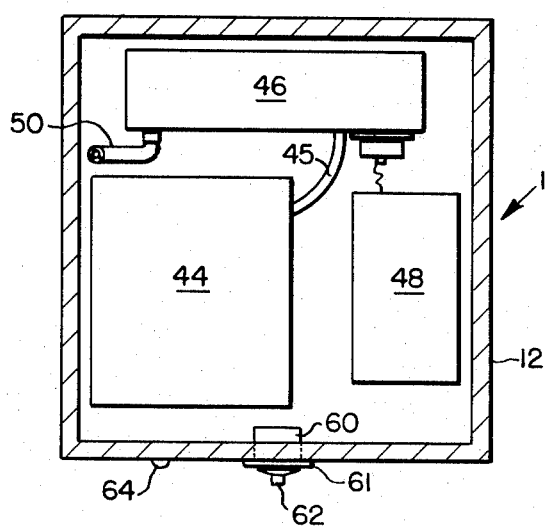
FIG. 3 is a sectional view taken along the line 3—3 in FIG. 1 looking in the direction of the arrows.

FIG. 2 illustrates a modified container 20', which may be substituted in unit 10 for container 20. In this embodiment an annular recess 70 is formed in the upper end 35' of the container coaxially of its central opening. A cover 38' containing an activated-charcoal filter element 39', which is held in place by the perforated plate 40', has its lower end removably seated in recess 70 to cover the central opening in the container. Excess gases developed in container 20' pass upwardly through ports 41' in plate 40', and through filter 39' to one end of a plastic discharge or exhaust tube 72 that is secured in a central opening in the closed end of cap 38'. The opposite end of tube 72 can be disposed to convey exhaust gases from container 20' to the out-of-doors, for example, or to a kitchen drain or the like, so that any excess ozone gas not absorbed by filter 39', will not cause any damage to occupants or items in the room containing unit 10. Also, groove 70 may be filled with water to improve the seal between cap 38' and container 20'.

From the foregoing it will be apparent that the novel purifier disclosed herein is extremely compact and versatile compared to prior ozone-type water purifiers. The unit can be readily carried about for use on camping trips, for example, or for use at cabins, cottages, or even at permanent residences, where the drinking water normally has high concentrations of sulphur, chlorine or other such impurities which tend to produce bad taste or odors in the otherwise potable water. Moreover, the ozone gas will kill bacteria, and cysts that cause amoebic dysentery and viruses. The activated charcoal filters in the unit function to remove excess ozone from the exhaust gases, and from the water itself as it is drawn from the unit; and these filters are readily replaceable. The holes in the plates 40 and 40' are radially spaced outwardly relative to the single discharge port formed in the closed end of the associated cap 38 or 38', so that gases passing through the activated charcoal filters 39 and 39' must flow axially and radially inwardly of these filters before being exhausted from cap 38 or 38', thus making the most efficient use of filters 39 and 39'. Moreover, the unit can only be actuated by operation of the timer 60, and since the timer always returns automatically to a zero or shut-off position, the generator 46 cannot be left on accidentally for long periods of time.

Instead of using a perforated tube 54 for diffusing the ozone gas, the discharge end of pipe or tube 52 could be connected in known manner to one or more sintered blocks, which would be disposed in the bottom of container 20 or 20' to break up the ozone gas into small bubbles upon admitting the gas into water in the container. The containers may be blow molded, for example, from polyvinylchloride or like plastic material that is inert with respect to ozone gas. Also, instead of mounting the charcoal filter 30 and the paper filter 32 in a recess in the bottom of container 20, one or both of these filters could be suspended in a conventional housing of the type that fastens releasably to the lower, discharge end of spiggot 27, thereby to hold one or both of these filters exteriorly of container 20, and in position to filter water as it leaves the spiggot.

Having thus described my invention, what I claim is:

1. A portable water purifier, comprising
   a base,
   a container for water removably seated at its lower end on said base,
   a cover removably mounted over an opening in the upper end of said container, and having therein a vent for exhausting gases from said container,
   means including a normally closed valve connected to an outlet in said container adjacent said lower end thereof, and operable selectively to drain water out of said container through said outlet,
   a diffuser mounted in said container adjacent said lower end thereof, and having therein a plurality of perforations opening on the interior of said container,
   means for selectively feeding ozone gas to said diffuser to be fed into said container through said perforations, and
   means in said cover for removing excess ozone from the gases exhausted from said container through said vent.

2. A portable water purifier as defined in claim 1, wherein said means for removing excess ozone from said gases comprises an activated charcoal filter removably mounted in said cover beneath said vent.

3. A portable water purifier as defined in claim 2, wherein
   said cover comprises a hollow cap having its open end sealingly engaged with said container, and having in its closed end a central hole defining said vent,
   said activated charcoal filter is removably mounted in said cap transversely of said vent,
   a plate is removably mounted in said cap at the side of said filter remote from said vent, and extends transversely of the open end of said cap releasably to retain said filter therein, and
   said plate has therethrough a plurality of openings radially offset from the axis of said vent, whereby gases exhausted from said container pass successively through said openings in said plate, said filter and said vent.

4. A portable water purifier as defined in claim 2, including a second, activated charcoal filter removably mounted on said container transversely of said outlet to remove excess ozone in the water drained from said container upon operation of said valve.

5. A portable water purifier as defined in claim 4 including a third, fibrous filter removably mounted in said container to overlie the side of said second filter remote from said outlet, whereby water drained by said valve from said container must pass successively through said fibrous filter and then said second charcoal filter.

6. A portable water purifier as defined in claim 4, wherein
   said container has in its lower end a central recess containing said second filer and projecting into a corresponding recess in the upper end of said base,
   an outlet duct is integral at its inner end with said container and projects radially therefrom through a registering groove formed in said upper end of said base, and
   the bore in said duct opens at its inner end on said central recess in said container.

7. A portable water purifier as defined in claim 1, wherein said feeding means comprises an ozone gas generator mounted in said base with its gas outlet removably connected to said diffuser, and timer means operatively connected to said generator and manually actuatable intermittently to operate said generator for limited periods of time.

8. A portable water purifier as defined in claim 7, including a first tube connected at one end to said outlet of said generator, and extending at its opposite end upwardly above the upper end of said container, when the latter is seated on said base, a second tube connected at one end to said diffuser and extending at its opposite end upwardly through said container and the upper end thereof, and means releasably connecting together the upper ends of said tubes, and operably manually to disconnect said upper ends to enable removal of said container from said base.

9. A portable water purifier, comprising a hollow base, an ozone gas generator mounted in said base, means including a manually operable timer for selectively operating said generator intermittently for limited periods of time, a container for water removably mounted on said base and having adjacent its lower end an outlet controlled by a manually operable valve for selectively draining water from said container, a diffuser mounted in said container adjacent its lower end, means releasably connecting the output of said generator to said diffuser, whereby upon operation of said generator ozone gas is distributed as fine bubbles into the water in said container by said diffuser, a cap removably mounted over an opening in the upper end of said container, said cap having a small vent in its closed end to allow gases to be exhausted from the interior of said container, and an activated charcoal filter removably mounted in said cap transversely of said vent to absorb ozone from the gases exhausted from the container.

10. A portable water purifier as defined in claim 9, including a second activated charcoal filter removably mounted in said container adjacent its lower end and transversely of said outlet to remove excess ozone from the water drained from said container through said outlet.

11. A portable water purifier as defined in claim 9, wherein said timer includes a rotatable actuator manually operable from the exterior of said base to effect operation of said generator, and operative automatically to stop the operation of said generator after said generator has been in operation for a predetermined period of time.

* * * * *